United States Patent [19]

Agrawal

[11] 4,254,080
[45] Mar. 3, 1981

[54] FORMING SUBSTANTIALLY RECTANGULAR ARTICLES FROM PREFORMS OF POLYALKYLENE TEREPHTHALATE

[75] Inventor: Purushottam D. Agrawal, Galesferry, Conn.

[73] Assignee: Monsanto Company, St. Louis, Mo.

[21] Appl. No.: 23,941

[22] Filed: Mar. 27, 1979

[51] Int. Cl.³ .............................................. B29C 17/07
[52] U.S. Cl. ..................................... 264/537; 264/532; 264/535
[58] Field of Search ............... 264/520, 521, 523, 524, 264/525, 526, 529, 530, 535, 537, 538, 540, 541, 542, 543, 532; 215/1 C; 428/35

[56] References Cited

U.S. PATENT DOCUMENTS

| | | | |
|---|---|---|---|
| 3,632,713 | 1/1972 | Seefluth | 264/520 |
| 3,662,048 | 5/1972 | Turner | 264/520 X |
| 3,733,309 | 5/1973 | Wyeth et al. | 264/540 X |
| 3,775,524 | 11/1973 | Seefluth | 264/521 |
| 3,892,830 | 7/1975 | Hudson et al. | 264/520 |
| 3,900,120 | 8/1975 | Sincock | 215/1 C |
| 3,917,095 | 11/1975 | Seefluth | 215/1 C |
| 3,989,784 | 11/1976 | Uhlig | 264/520 |
| 4,117,050 | 9/1978 | Appel et al. | 264/520 X |
| 4,131,666 | 12/1978 | Agrawal et al. | 264/521 |

FOREIGN PATENT DOCUMENTS 1267430  3/1972  United Kingdom .
1355287  6/1974  United Kingdom .

OTHER PUBLICATIONS

J. A. Antonopoulos and F. G. Hohmann, *Modern Plastics*, "Stretch-blow molding PVC and Nitriles", 9-1976.

*Primary Examiner*—Jan H. Silbaugh
*Attorney, Agent, or Firm*—Michael J. Murphy

[57] ABSTRACT

In forming hollow, molecularly oriented articles having substantially rectangular cross sections from thermoplastic preforms by a method which includes distending the preforms in a mold while at molecular orientation temperature, the improvement providing improved material distribution in regions furthest from the central axes of the articles (e.g. in the corner areas) when the thermoplastic is moldable polyalkylene terephthalate having an inherent viscosity of at least 0.55 which involves limiting the corner definition ratio to between about 2 to about 14 and the circular deviation ratio to no greater than about 2.4 at the cross section during distension and controlling axial and maximum radial stretch of the preforms within predetermined limits.

9 Claims, 7 Drawing Figures

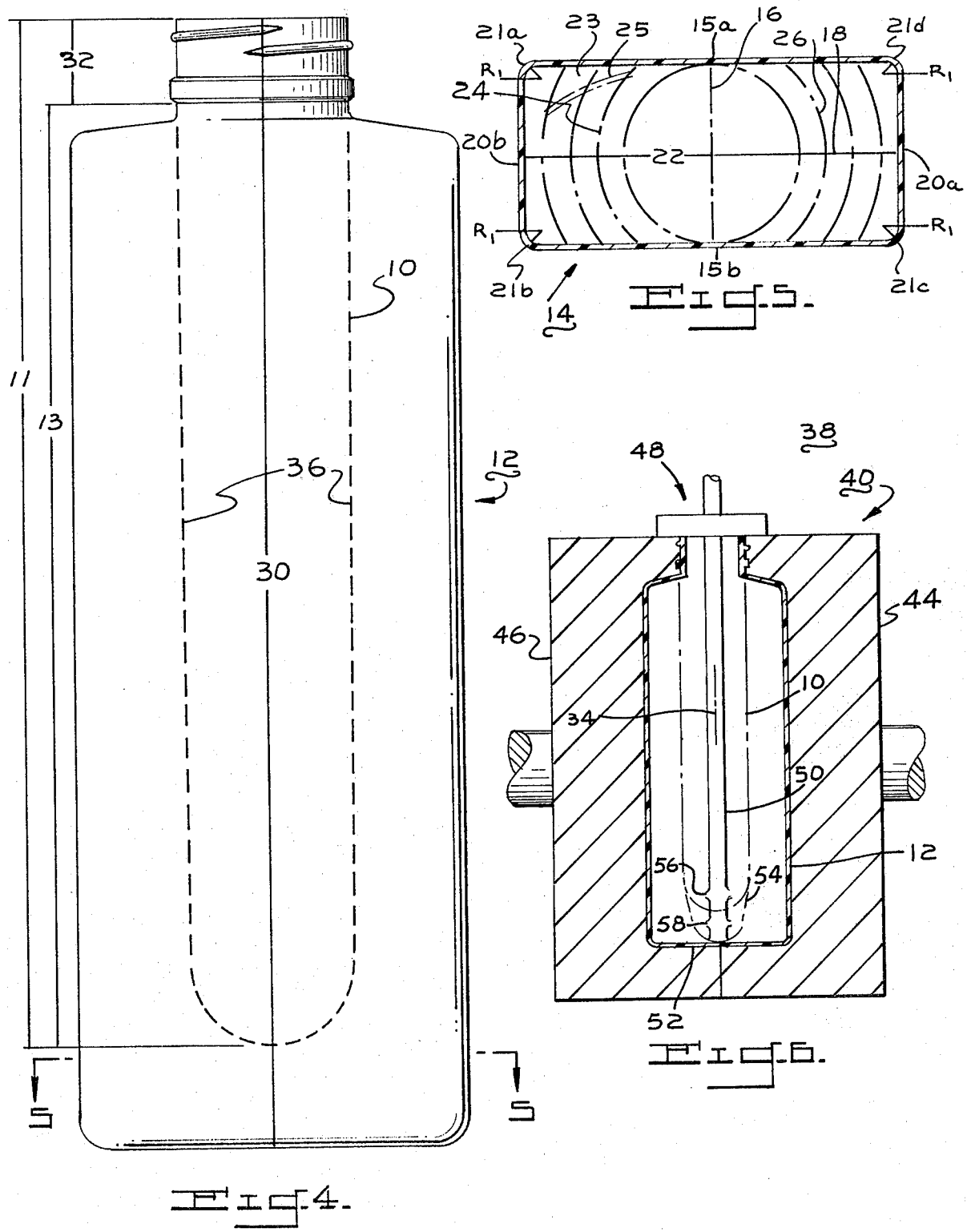

FORMING SUBSTANTIALLY RECTANGULAR ARTICLES FROM PREFORMS OF POLYALKYLENE TEREPHTHALATE

CROSS REFERENCE TO RELATED APPLICATION

Improvements In Forming Non-Cylindrical Articles From Preforms Of Polyalkylene Terephthalate, Purushottam D. Agrawal, U.S. Ser. No. 971,398, filed Dec. 20, 1978.

BACKGROUND OF THE INVENTION

This invention relates to forming hollow, molecularly oriented articles such as containers of polyalkylene terephthalate such as polyethylene terephthalate (PET), and more particularly to improvements in a preform process for forming articles of such material having certain non-round cross sections wherein material distribution is improved in the vicinity of the ends of the sides.

Containers of molecularly oriented PET are known and desirable for packaging because of superior clarity, impact strength and barrier properties. Prior to this invention, configurations of such containers have been largely limited to circular yet it is frequently desirable for aesthetics and functional reasons such as space conservation to be able to blow mold non-circular containers of rectangular, e.g. square, shape with good material thickness uniformity in the peripheral direction.

Attempts in the past to form non-round configurations from commodity thermoplastics such as polyethylene and polypropylene in a process wherein prior-shaped preforms are conditioned to molecular orientation temperature before distension in the blow mold entailed establishing special conditions to promote wall thickness uniformity between areas furthest from the lengthwise axis and areas close to the axis. As disclosed in U.S. Pat. No. 3,950,459, such systems usually involved establishing temperature differences in the circumferential direction of the preforms such that portions to expand less were cooler and therefore would stretch less than hotter portions which were to stretch more in the blow mold. If such temperature difference is not well established excessive thinning or even blow out at the extremities of the cross section could be expected to occur. Needless to say, consistent accurate provision of such a differential does not facilitate simplicity of the preform heat treating process.

SUMMARY OF THE INVENTION

Now, however, process improvements have been developed to facilitate fabrication of non-round hollow articles of polyalkylene (e.g. polyethylene) terephthalate.

Accordingly, it is a principal object of this invention to provide improvements in a process for forming non-round, molecularly oriented, hollow articles such as containers from polyalkylene terephthalate, e.g. PET, thermoplastic materials, which result in improved material thickness distribution in regions furthest from the lengthwise axis of non-round cross sections of the article.

Another object of this invention is to recognize and use the inherent mechanical properties of PET to advantage to promote such improved material distribution.

A specific object is to recognize and define relationships between forming parameters and the extent to which the cross sectional shape can be varied in blowing substantially rectangular molecularly oriented PET containers with good contour definition in the vicinity of the extremes of the container cross section, e.g. in the rounded corners.

Other objects of this invention will in part be obvious and will in part appear from the following description and claims.

These and other objects are provided in the method of forming a molecularly oriented hollow article having a substantially rectangular cross section from a preform of thermoplastic material, which includes distending the preform in a mold while at molecular orientation temperature, by providing the improvement wherein the thermoplastic material is moldable polyalkylene terephthalate having an inherent viscosity of at least about 0.55 and the forming operation comprises, in combination, the steps of limiting the corner definition ratio to between about 2 to about 14 and the circular deviation ratio to no greater than about 2.4 at the cross section during such distending and controlling such distending according to the relations:

% axial stretch $(A)$ = $\dfrac{\text{article length minus preform length times 100}}{\text{preform length minus preform neck finish length}}$ % maximum radial stretch $(B)$ = $\dfrac{\text{maximum container outside diameter minus minimum preform outside diameter times 100}}{\text{preform outside diameter}}$ wherein: A is between about 5 to about 100 and B is no greater than about 334.

BRIEF DESCRIPTION OF THE DRAWINGS

In describing the overall invention, reference will be made to the accompanying drawings wherein:

FIG. 4 is a vertical elevational view of a container formable from a preform according to this invention;

FIG. 5 is a schematic sectional view along 5–5 of FIG. 4;

FIG. 6 is a schematic elevational view of a stretch-blow assembly capable of converting the preform outlined in FIG. 4 into the container therein shown; and FIG. 7 is a view similar to FIG. 5 of an alternative container cross section.

DESCRIPTION OF ILLUSTRATED EMBODIMENTS

In forming containers of polyethylene terephthalate having non-round cross sections (such as substantially rectangular including square) either throughout most or all of the length or at least at one or more horizontal sections along such length, by distending circular preforms at molecular orientation temperature in a blow mold, such cross sections can be formed with good wall thickness uniformity because of the mechanical properties of the PET material without relying on a circumferential temperature gradient in the material of the preforms.

Figure 3:
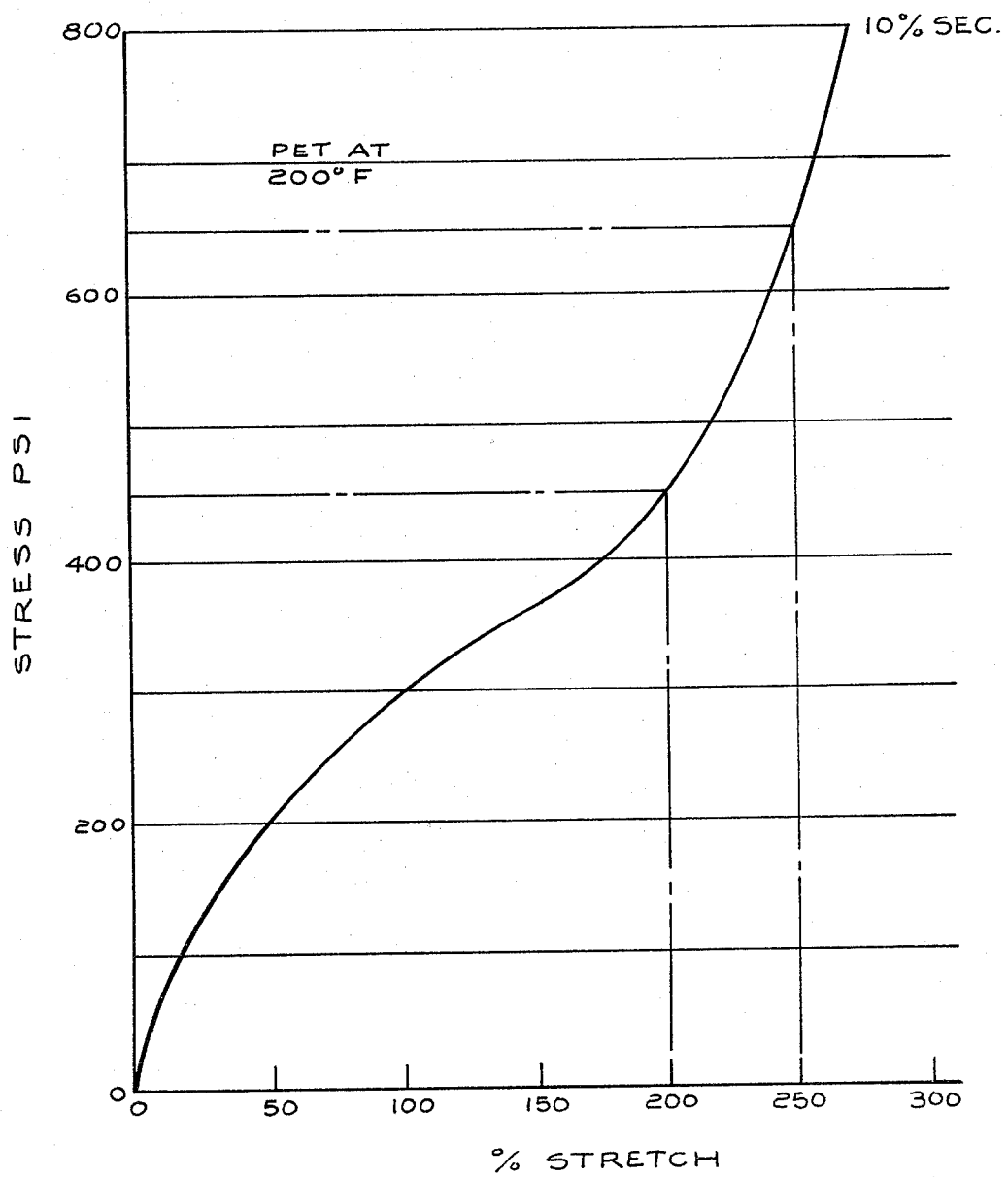
FIG. 3 is a stress/strain diagram at a stated strain rate for PET at a stated temperature.

More particularly, preform 10, shown in outline in FIG. 4, is circular in cross section and is to be expanded in blow mold 40 (FIG. 6) having a cavity configuration conforming in outline to that of bottle 12 (FIG. 4) having maximum rectangular cross section 14 (FIG. 5) along its length lying in a plane perpendicular to its longitudinal axis. During blowing at molecular orientation temperature, preform 10 will initially distend radially until its outer surface first contacts the mold cavity wall in the vicinity of the ends of minor diameter or axis 16 (FIG. 5). Such initial expansion is illustrated schematically in FIG. 5 by the series of successively larger concentric circles shown in outline form with the initial contact just referred to occurring at 15a, 15b. Further expansion to complete formation of the rectangular shape stretches the free sides, schematically shown at 24, 26 in FIG. 5, of the partially expanded circular form which have not yet contacted the cavity surface outwardly toward the extremes of major axis 18 to eventually form short walls 20a, 20b at the ends of such axis. This further expansion draws plastic from the portions of the circumference of the circular shape which have already contacted the mold wall. The latter portions of the preform (i.e. the regions including 15a and 15b in FIG. 5) will be necessarily cooler than free, unrestrained portions 24, 26 at the ends of the developing rectangular shape, since the mold cavity walls are cooled in conventional manner by circulation of a heat transfer medium through channels in the mold just beneath the cavity surface. PET material by nature exhibits significant resistance to stretch at molecular orientation forming temperatures. Thus, as indicated in FIG. 3, at a temperature of 200° F. (93° C.), and a 10% per second strain rate, a stress of 450 psi is required to achieve 200 percent stretch. For an additional 50 percent increase in stretch (from 200 to 250 percent along the x axis in FIG. 3) a stress increase of 200 psi (14 kg./cm.$^2$) (along the y axis) is required. At 200 percent stretch a stress of 450 psi (31.5 kg./cm.$^2$) is needed while at 250 percent, a stress of 650 psi (45.5 kg./cm.$^2$) is needed. This indicates a sharp increase in stress for relatively low percent stretch which has been found to cause a strain hardening effect at the 10 percent per second strain rate. Under actual container manufacturing conditions, however, strain rates on the order of 200 percent per second are more realistic in achieving economical blow molding cycle times. Compared to stress requirements at the 10 percent per second strain rate, at a 200 percent per second strain rate it is expected that PET will exhibit an even more severe rise in stress to achieve a relatively low percent stretch. This strain hardening characteristic of PET facilitates formation of rounded corners in rectangular sections of relatively uniform thickness in that after the polymer is stretched a given amount, the force required for further stretching substantially increases and at that point more material will be stretched out of areas not previously stretched much—i.e. the initially relatively thick portions in the vicinity of 15a and 15b in FIG. 5 which have stretched only to the ends of minor axis 16. This self-adjusting nature of PET which is reflected in a pulling of material out of regions 15a and 15b to provide material which eventually forms walls 20a, 20b and corners 21 results in an improved degree of wall thickness uniformity in a substantially rectangular configuration.

In comparison, for comparable amounts of stretch and stretch rates with a thermoplastic material having a relatively flat stress/strain curve, for example a nitrile polymer such as a 70/30 weight percent acrylonitrile/styrene material, stress buildup will not increase sharply with strain. This means that material for walls forming sides at the ends of the major axis will not be pulled out of the already shaped and partially chilled plastic at the ends of the minor axis with the result that the thickness at the free expanding ends will continue to decrease as the plastic moves towards the ends of the major axis. This can lead to fracture in the vicinity of the extremes of the major axis if stretching is excessive or else substantial local thinning of the wall thickness versus that in the vicinity of the ends of the minor axis.

The tendency of PET to strain harden, however, imposes restrictions on the amount of definition achievable in highly stretched areas such as in the vicinity of and including rounded corners, 21a, 21b, 21c and 21d (FIG. 5) of a substantially rectangular cross section. In accordance with the invention, for containers having a substantially rectangular (including square) cross section a relationship has been established between (a) corner definition ratio (b) circular deviation ratio (c) percent axial stretch and (d) percent maximum radial stretch which, when followed, will provide excellent definition in highly stretched cornered areas of containers made of polyalkylene terephthalate such as PET thermoplastic materials. Such relationships are graphically depicted in FIGS. 1 and 2 and comprise limiting during stretching the corner definition ratio to between about 2 to about 14 and the circular deviation ratio to no greater than about 2.4. For purposes of the present invention, corner definition ratio is defined as two times the maximum distance between the lengthwise axis at the planar cross section of the finished rectangular configuration (or longitudinal axis 34 of the preform when mounted initially in the mold as at 10 in FIG. 6) and the mold cavity surface defining a planar side of the rectangular shape divided by the radius of the rounded corner. For the configuration of FIG. 5, such corner definition ratio is represented by two times distance 22 divided by $R_1$. For the symmetrical substantially square cross section of FIG. 7, such corner definition ratio is distance 24 plus distance 28 divided by $R_2$. The circular deviation ratio is defined as two times the maximum distance between the lengthwise axis at the planar cross section of the finished rectangular configuration (or longitudinal axis 34 of the preform when mounted initially in the mold as at 10 in FIG. 6) and the mold cavity defining a planar side of the rectangular shape divided by two times the minimum distance between the lengthwise axis at the planar cross section of the finished rectangular configuration (or longitudinal axis 34 of the preform when mounted initially in the mold as at 10 in FIG. 6) and the mold cavity defining a planar side of the rectangular shape. For the configuration of FIG. 5, such circular deviation ratio is major diameter 18 or two times distance 22 divided by minor diameter 16 whereas for the square configuration of FIG. 7 such ratio will always be one since distances 24 and 28 are equal.

With respect to blowing rectangular as compared with other cross sections such as oval, the corner definition to circular deviation ratio limits will be wider for rectangular shapes since the expanding portions of the preform after initial contact with the mold (i.e. the portions on either side of regions 15a and 15b in FIG. 5) will be able to stretch more before contacting the walls of the rectangular cross section. For example, with respect to FIG. 5, the plastic will be able to freely extend through region 23 before contacting the mold surface whereas such additional expansion in an area equivalent to 23 could not occur if the cavity was oval as such oval cavity outline is schematically depicted by short phantom line 25 in FIG. 5. Because of this the previously described cooling effect associated with mold wall contact will be less pronounced with rectangular shapes thus facilitating formation of relatively shallow radii $R_1$, $R_2$ in FIGS. 5 and 7 in rectangular configurations.

Further in accordance with the invention, preform distension in the mold is controlled according to the relations: percent axial stretch (A) equals article length (30 in FIG. 4) minus preform length (11 in FIG. 4) times 100 divided by preform length minus preform neck finish length (32 in FIG. 4); and percent maximum radial stretch (B) equals the maximum planar distance (22 in FIG. 5 and 24 in FIG. 7) to the mold surface defining a side of the rectangular shape from the preform axis (which in FIG. 6 is 34) when mounted in the mold minus the preform outside diameter (36 in FIG. 4) times 100 divided by the preform outside diameter wherein: A is between about 5 to about 100 and B is no greater than about 334. In situations where the finish is formed on the article during reshaping in the article blow mold, i.e. the preform does not have a molded finish, a length equivalent to the finish length on the formed article should be used in the foregoing equation for percent axial stretch, or if no finish is provided, a figure should be used for the length of plastic, if any, which is not axially stretched during final forming. With respect to the amount of axial stretch of the elongated preform being reshaped, this can vary along the length. For example, in the illustrated embodiment plastic close to the neck finish will stretch less than that adjacent the closed end whereas that in between will stretch an amount intermediate these extremes. Instead of using the simplified foregoing equation to determine axial stretch, the term "average" as it applies to axial stretch can be determined by considering the amount of axial stretch that occurs in incremental sections of the preform length and then calculating the arithmetic average of such individual stretch amounts. This is facilitated by forming spaced grid markings on the unstretched preform surface, e.g. 1 inch (2.54 cms.) apart, and computing individual stretch amounts by measuring the distance between immediately adjacent marks after axial stretching and before blowing.

Figure 2:
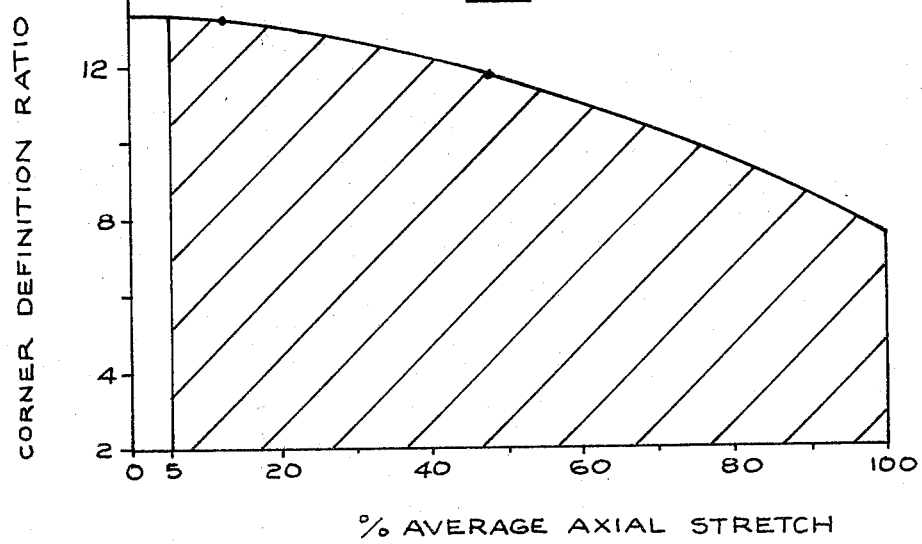
FIG. 2 is a graphical representation of the relationship of the level of stretch which should be used according to the invention in forming rectangular containers having the dimensions shown on the ordinate of FIG. 1.
Figure 2:
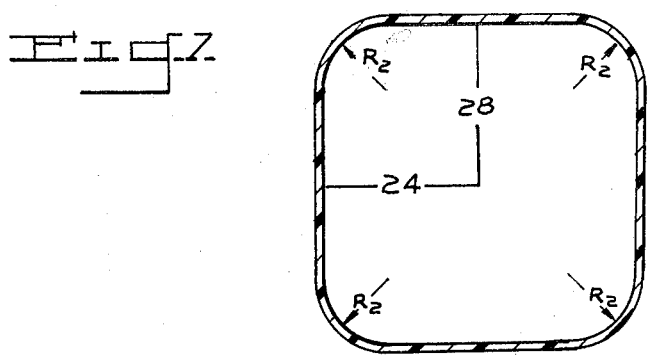

Further with respect to the axial stretch parameter of FIG. 2, for a given amount of plastic in the preform adequate to produce a container of predetermined weight, if the initial preform is excessively long with respect to the lengthwise axis (30 in FIG. 4) of the container, which means the preform thickness is relatively small, the strain hardening effect because of the reduced thickness will be pronounced and this will tend against sharp formation of the desired corner radii since excessive thinning will occur as material approaches the areas of maximum stretch. In addition, when the preforms are injection molded, since PET is shear sensitive, lengthy movement of the material along a relatively elongated narrow injection mold cavity promotes formation of acetaldehyde which is a decomposition product which can cause taste problems when the containers are intended to package human-consumable substances. On the other hand, if the preform is made excessively thick to offset the disadvantages just mentioned, different problems can be expected during injection molding. More specifically, if the thickness is too great even though sections of the thickness adjacent the outer and inner surfaces are chilled relatively quickly in the injection forming mold to below the crystalline freezing point of the material via chilling contact with the cooled preform injection mold and core rod to prevent formation of crystals and therefore cloudiness in the material, heat retained toward the middle of such relatively thick sections tends to cause the material to heat back up again after ejection from the mold to promote crystal formation and the cloudiness which it is desired to avoid.

FIG. 6 shows a stretch-blow assembly 38 for converting a preform 10 into molecularly oriented container 12 having the configuration of FIG. 4. This is accomplished by first enclosing each preform 10 while within the molecular orientation temperature range for the thermoplastic material of which it is formed within partible sections 44, 46 of conventional blow mold 40. Next, stretching mechanism 48 is moved over the open end of blow mold 40 and preform 10 whereupon telescopic stretch rod 50 is caused to move to extended position by a suitable mechanism, not shown, in order to force the hemispherical end of the preform 10 against base portion 52 of blow mold 40 thereby axially stretching the body portion of the preform (13 in FIG. 4) in the manner illustrated in phantom at 54 in FIG. 6. Simultaneously therewith or preferably immediately thereafter, a blowing medium such as compressed air is admitted to the interior of the preform through openings 56, 58 in rod 50 to stretch it radially outwardly against the mold cavity walls in the manner previously described into the shape of bottle 12. Under certain circumstances, for example those contemplating non-pressure applications for the finished container, it may not be necessary to provide a separate stretch rod in that the pressure of the blowing medium and the reduced length of the preform versus the container length may be adequate to provide the axial stretch desired.

The nature of the surface of the mold cavity against which the thermoplastic is forced into shaping engagement can have an effect on the limits of formation along the major axis of the non-round container being formed. In this respect, coating such surface with a heat insulative material such as Teflon ® in the area forming the panels of the container between its rounded corners can improve the ability to blow out into the short sides and into corners having relatively shallow radii—$R_1$ and $R_2$ in FIGS. 5 and 7. Such Teflon ® coating apparently improves slippage of the material on the coated surface and retards excessive heat transfer from the plastic thereby preventing premature setting of the material. On the other hand, if cycle time is not of major concern the same effect can most likely be achieved by operating the molds at elevated temperature through use of a heat transfer medium circulating through channels in the mold providing a cavity surface temperature on the order of about 100° F. to 180° F. (38° to 82° C.).

Hollow articles such as containers formable according to the invention from preforms 10 may vary widely in size and are preferably characterized in terms of weight and volume as ranging from between about 0.03 to about 0.13 gms/cc of internal volume. The invention is applicable to non-round, substantially rectangular cross sectional configurations in container form wherein the latter have a volume of between about 170 to 3780 cc. and preferably between about 470 to 1890 cc. Though single layer articles are preferred, composite containers having plural layers of thermoplastic material in face-adhering contact are likewise within the scope of those formable according to this invention as long as at least one layer comprises a major proportion (e.g. at least about 50 weight percent) of a polyalkylene terephthalate.

The invention is applicable to the shaping of moldable polyalkylene terephthalates such as polyethylene and polybutylene terephthalate.

Polyethylene terephthalate useful in preparing the thermoplastic articles of this invention includes polymers wherein a major proportion such as about 50 and preferably up to about 97 weight % of the polymer contains repeating ethylene terephthalate units of the formula:

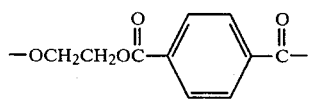

with the remainder being minor amounts of ester-forming components. It also includes copolymers of ethylene terephthalate wherein up to about 10 mole percent of the esterifying glycol units are derived from diethylene glycol; propane-1,3-diol; butane-1,4-diol; polytetramethylene glycol; polyethylene glycol; polypropylene glycol; 1,4-hydroxymethylcyclohexane and the like, and up to 10 mole percent of the acid component is derived from acids such as isophthalic; bibenzoic; naphthalene 1,4- or 2,6-dicarboxylic; adipic; sebacic; and decane-1,1-dicarboxylic acids and the like.

Polyethylene terephthalate should have an inherent viscosity (1% concentration of polymer in a 37.5/62.5 weight percent solution of tetrachloroethane/phenol, respectively, at 30° C.) of at least 0.55 to obtain the desired end properties in the formed articles. Preferably the inherent viscosity is at least about 0.7 to obtain an article having excellent toughness properties, i.e. resistance to impact loading. The inherent viscosity of the polymer solution is measured relative to that of the solvent alone and is defined as follows:

$$\text{inherent viscosity} = \frac{\text{natural logarithm} \frac{\text{viscosity of solution}}{\text{viscosity of solvent}}}{C}$$

where C is the concentration expressed in grams of polymer per 100 milliliters of solution.

Formation of containers with biaxial orientation according to this invention occurs when the outside surface temperature of the thermoplastic material of the preforms is between about 180° to about 230° F. (82.2° to 110° C.) and preferably about 37° F. (93.3° C.) above the glass transition temperature of the material, the latter being about 162° to about 165° F. (72.2° to 73.9° C.) for PET.

The following examples are given to illustrate the principles and practice of this invention and should not be construed as limitations thereof.

EXAMPLE I

Containers of rectangular cross section throughout the entire length, identical in form to bottles 12 in FIG. 4, are formed from reheated, cylindrical, injection molded preforms. Such containers have 24 ounces (710 cc.) nominal capacity, a weight of 48 gms., a major diameter (18 in FIG. 5) of 3.3 inches (8.4 cms.) a minor diameter (16 in FIG. 5) of 2.7 inches (6.88 cms.), a total length of 7.88 inches (20.0 cms.) a circular deviation ratio (18 divided by 16 in FIG. 5) of 1.22 and a corner definition ratio (18 divided by $R_1$ in FIG. 5) of 13.2.

PET having an inherent viscosity of about 0.72 was injection molded in conventional equipment into preforms configured as shown at 10 in FIG. 4 having the following dimensions:

total length = 7.0 inches (17.7 cms.);
finish length = 0.57 inches (1.45 cms.);
minimum outside diameter = 1.131 inches (2.873 cms.); and
average thickness = 0.102 inches (0.259 cms.)

(Average thickness is defined as minimum thickness along the length of the preform below the finish plus maximum thickness along such length divided by two). With cavity dimensions of a blow mold set to provide the above bottle configuration, the percentages of axial stretch and radial stretch were calculated at 13.3 and 192% respectively as follows:

% axial stretch (A) =

$$\frac{\text{bottle length minus preform length (100)}}{\text{preform length minus preform neck finish length}}$$

$$A = \frac{7.88 - 7.0}{7.0 - 0.57} (100)$$

$$A = 13.7\%$$

% maximum radial stretch (B) =

$$\frac{[\text{maximum container outside diameter minus preform outside diameter}] (100)}{\text{preform outside diameter}}$$

$$B = \frac{(3.3 - 1.13)}{1.13} (100)$$

$$B = 192\%$$

While rotating about their lengthwise axes, the body portions of such preforms (13 in FIG. 4) are heated from substantially room temperature to about 200°–230° F. (93° to 110° C.) in accordance with a heating arrangement shown in FIG. 3 of U.S. Pat. No. 4,036,927, the content of col. 6, lines 29–53 of which is incorporated herein by reference.

The heated preforms are introduced to a stretch-blow assembly as illustrated in FIG. 6 which included a mold cavity having a surface corresponding in shape and extent to that of the desired end bottle configuration and which is conventionally cooled via circulating water at cooling water temperature on the order of 21° C. The preforms are then stretched axially against the base of such cavity and expanded along the major and minor axes into heat exchange contact with the side walls to form the bottle shape.

All of the bottles in the foregoing run completely conform to the mold surfaces in the corner areas of the rectangular shape.

EXAMPLE 2

The forming procedure of Example 1 is repeated except that the total preform length is reduced from 7.0 to 5.5 inches (14 cms.). Average axial stretch is 47% while maximum radial stretch along the major axis is 189%. Each of the bottles formed conformed to the mold surfaces fully in the corner areas of the rectangular shape.

EXAMPLE 3

The bottle mold of Example 1 is revised to provide a corner definition ratio of 17.6 and the forming procedure of Example 1 is then repeated. In each case the plastic in the corner areas of the rectangular cross sections failed to fully conform to the mold cavity surface.

Figure 1:
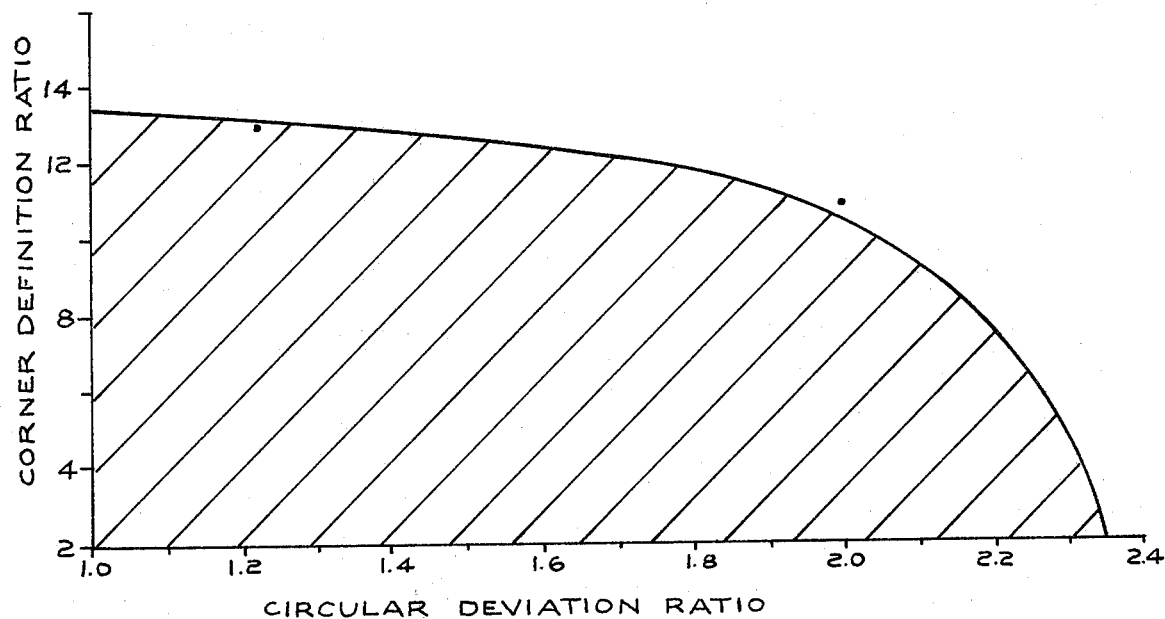
FIG. 1 is a graphical representation portraying dimensional limits of certain rectangular containers which can be effectively formed according to the invention.

Data from the foregoing Examples is used to form FIGS. 1 and 2.

The preceding Examples illustrate that when the circular deviation and corner definition ratios lie within the crosshatched area of FIG. 1 and the corner definition ratio to percentage axial stretch relationship is within the crosshatched portion of FIG. 2, good corner definition and material distribution is obtained at maximum percentage radial stretch levels no greater than about 334.

Though preforms forming the containers of this invention are preferably circular in cross section and are not purposely provided with a temperature differential in the circumferential direction prior to expansion in the blow mold in order to reduce the complexity of the preform heat treating process, it is within the scope of the invention to utilize non-cylindrical preforms heat treated to purposely develop a temperature gradient around the periphery prior to stretching in the blow mold. Preforms usable in the invention may be shaped by any well known plastic shaping technique such as injection or blow molding, thermoforming form sheet material with or without mechanical assist, compression molding and the like including combinations of the foregoing.

Various modifications and alterations will be readily suggested to persons skilled in the art. It is intended, therefore, that the foregoing be considered as exemplary only and the scope of the invention be ascertained from the following claims.

What is claimed is:

1. In the method of forming a molecularly oriented hollow article having a substantially rectangular cross section from a preform of thermoplastic material, which includes distending the preform in a mold while at molecular orientation temperature, the improvements wherein the thermoplastic material is moldable polyalkylene terephthalate having an inherent viscosity of at least about 0.55, said preform region forming said cross section is not treated before said distending for the purpose of establishing a circumferential temperature difference therein, and the distending comprises, in combination, the steps of:

expanding first portions of said region against mold wall portions at the end of a minor axis of a cavity conforming to said substantially rectangular cross section to form relatively thick sections thereat while expanding other portions a greater extent than said first portions toward wall portions at the end of a major axis of said cavity thereby establishing a strain hardened pattern in the material wherein such expanded other portions are strain hardened greater than said thick sections; and drawing material out of said thick sections as such expanded other portions of greater strain hardened level continue to expand toward the mold wall portions at the end of the major axis;

limiting the corner definition ratio to between about 2 to about 14 and the circular deviation ratio to no greater than about 2.4 at the cross section during said distending; and controlling said distending according to the relations:

$$\% \text{ axial stretch } (A) = \frac{\text{article length minus preform length times 100}}{\text{preform length minus preform neck finish length}}$$

$$\% \text{ maximum radial stretch } (B) = \frac{\text{maximum container outside diameter minus minimum preform outside diameter times 100}}{\text{minimum preform outside diameter}}$$

wherein:

A is between about 5 to about 100; and

B is no greater than about 334; thereby forming said article having reduced wall thickness variability at the substantially rectangular cross section in comparison with an article having the same cross section formed of thermoplastic material which does not strain harden during distension.

2. The method of claim 1 wherein the preform comprises a major proportion of polyethylene terephthalate.

3. The method of claim 2 wherein the inherent viscosity of the PET is at least about 0.7.

4. The method of claim 1 or 2 wherein the preform is injection molded and is substantially circular in cross section.

5. The method of claim 4 wherein the preform is distended against surfaces of a mold cavity having a heat insulative coating thereon.

6. The method of claim 4 wherein the article is a container.

7. The method of claim 6 wherein the container has a square cross section.

8. The method of claim 7 wherein the container has a nominal capacity of between about 470 to about 1890 cc.

9. The method of claim 1 wherein the substantially rectangular cross section is rectangular and the article is a container.

* * * * *